G. W. SCHILLING.
DEVICE FOR REMOVING ARTICLES FROM SHAFTS.
APPLICATION FILED DEC. 13, 1918.
1,310,447.
Patented July 22, 1919.
2 SHEETS—SHEET 1.
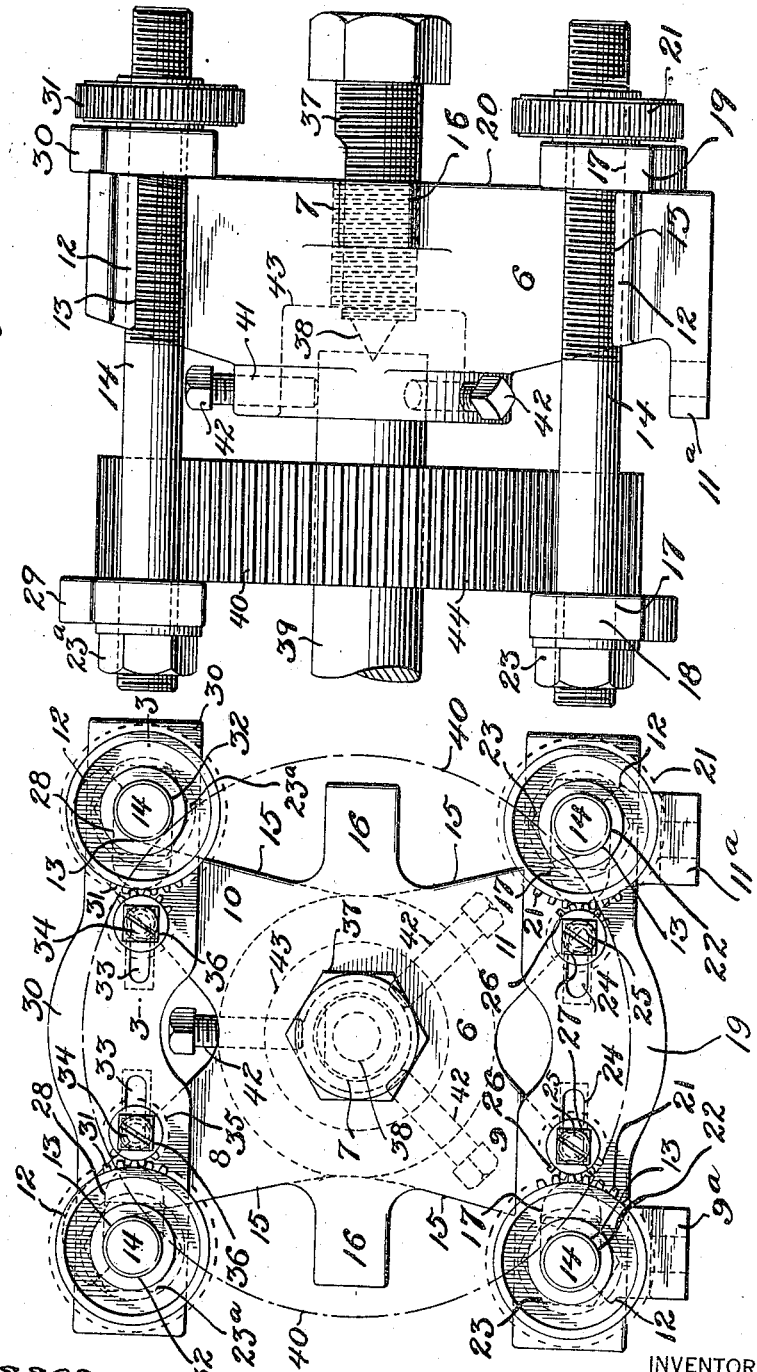
Witnesses,
Mary A. Ingler
Augustus B. Copper
INVENTOR
George W. Schilling
BY
Joshua R. H. Potts
his ATTORNEY

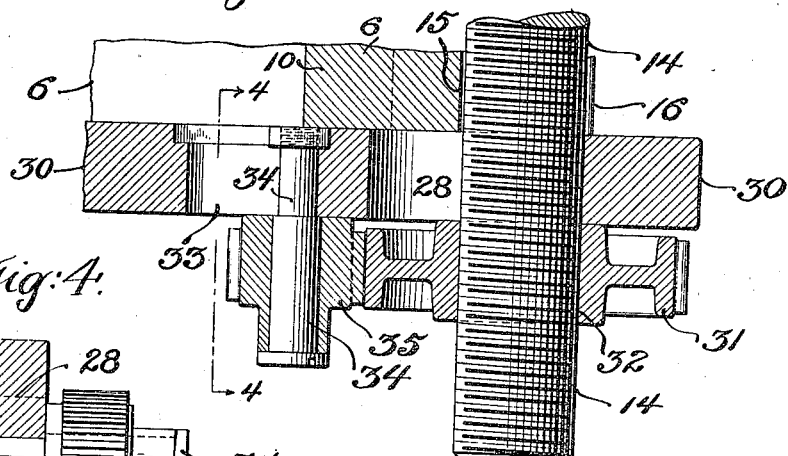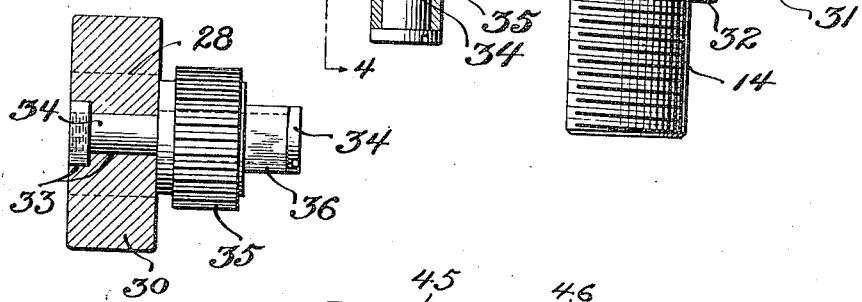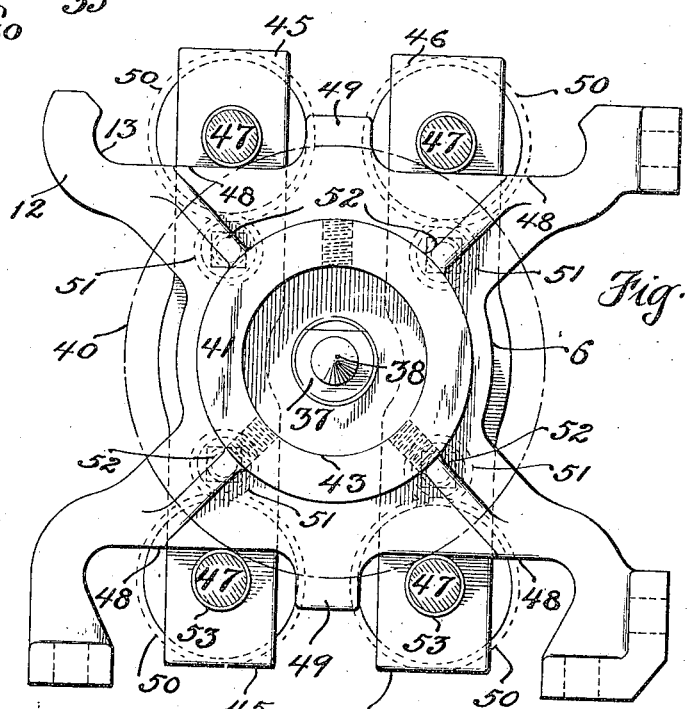

UNITED STATES PATENT OFFICE.

GEORGE W. SCHILLING, OF PHILADELPHIA, PENNSYLVANIA.

DEVICE FOR REMOVING ARTICLES FROM SHAFTS.

1,310,447. Specification of Letters Patent. Patented July 22, 1919.

Application filed December 13, 1918. Serial No. 266,550.

*To all whom it may concern:*

Be it known that I, GEORGE W. SCHILLING, a citizen of the United States, residing at Philadelphia, in the county of Philadelphia and State of Pennsylvania, have invented certain new and useful Improvements in Devices for Removing Articles from Shafts, of which the following is a specification.

One object of my invention is to provide an improved device, of the same general type as that of my United States Patent No. 1,268,285, of June 4th, 1918, which can be quickly and easily manipulated to remove gear wheels, pulleys, clutches or other articles from shafts.

Another object is to provide means whereby a mechanical advantage is attained so as to apply great power to the article which is to be removed by a comparatively small power exerted upon certain of the elements of my invention.

A further object is to so construct the parts of my invention that they can be adjusted and moved into various positions so as to remove articles of different sizes.

Another object is to make the parts of my invention of a durable and strong construction.

These objects, and other advantageous ends which will be described hereinafter, I attain in the following manner, reference being had to the accompanying drawings in which—

Figure 1 is an end elevation of one form of my invention,

Fig. 2 is a front elevation of Fig. 1,

Fig. 3 is an enlarged fragmentary sectional plan view taken on the line 3—3 of Fig. 1, Fig. 4 is a fragmentary section taken on the line 4—4 of Fig. 3, and Fig. 5 is an end elevation, partly in section, of a modified form of my invention.

Referring to Figs. 1 to 4, inclusive, of the drawings, 6 represents a head having a central tapped bore 7 and four arms 8, 9, 10 and 11. These arms extend substantially radially, as shown in Fig. 1, and each of the arms is provided with a hook 12 at its outer end. These hooks provide sockets 13 for bolts 14, as illustrated. The sockets 13 smoothly blend with surfaces 15, said surfaces extending at an angle inwardly in opposite directions, as clearly shown in Fig. 1. Lugs 16 within the width of the head 6 intercept the surfaces 15 on opposite sides of the head and form stops to limit the movement of adjacent bolts 14 toward each other on said opposite sides of the head.

The two lower bolts 14 extend through slots 17 in two link levers 18 and 19. The lever 19 abuts the rear surfaces 20 of the head 6 and, in turn, forms an abutment for gear wheels 21 which have screw threaded bores 22 in their hubs into which fit the threaded rear end portions of the two lower bolts 14. The opposite end portions of the two lowermost bolts 14 have nuts or heads 23 which abut the front surfaces of the link levers 18. The lever 19 has slots 24 formed therein and stud bolts 25 are adjustably secured within said slots 24. These stud bolts form bearings for pinions 26 which are of smaller diameter than the gear wheels 21 and are adapted to respectively mesh therewith. Each of the pinions 26 has an angular shank 27 extending therefrom which can be readily turned with a wrench lever so as to cause the rotation of the pinion. This action will also cause the rotation of the gear wheels 21 on the lower bolts 14, and since said gear wheels are in screw threaded connection with said latter bolts, the link levers 18 will be moved toward each other for a purpose which will be more thoroughly described hereinafter.

The upper two bolts 14 also pass through slots 28 in link levers 29 and 30 which are respectively similar to the link levers 18 and 19. The upper bolts 14 have gear wheels 31, said gear wheels having screw threaded hub bores 32 into which fit the rear threaded portions of the upper bolts. In like manner, the link lever 30 is provided with slots 33 in which are adjustably secured studs 34 which are constructed similarly to the studs 25. These studs 34 provide bearings for pinions 35 which mesh with the gears 31, said pinions being of smaller diameter than said gears. Each of the pinions has a square shank 36 projecting therefrom to permit the attachment of a wrench lever so that the pinions can be freely rotated. Nuts or heads 23ª, on the upper bolts 14, abut the front of the link lever 29, as clearly shown in Fig. 2.

A threaded plug bolt 37 fits the bore 7 in the head 6 and has a pointed end 38 adapted to abut the end of a shaft, such for example, as the shaft 39; it being considered that said shaft 39 has a gear wheel 40 thereon which is to be removed. The head 6 has an integral collar or boss 41 through which extend set screws 42. The head 6 has a recess or cavity 43 which extends through the boss 41 and is adapted to permit the end of the shaft 39 to extend therein. By this means, the set screws 42 can be tightened so as to engage the shaft 39 and hold the head 6 upon the shaft 39 while the link levers are being adjusted, so as to engage the surface 44 of the gear wheel 40. The pinions 26 and 35 can then be rotated in such direction as to cause the bolts 14 to slide longitudinally through the sockets 13 and in so doing, the head 23 of the bolts will move the link levers 18 and 29 toward the head 6. In so doing, the gear wheel 40 will be slid along the shaft 39 and thereby initially loosened. To entirely remove the gear wheel, the set screws 42 can be loosened and the plug bolt 37 can be turned inwardly to cause the end of the shaft 39 to be positioned entirely out of the cavity 43.

By having the pinions of smaller diameter than the gear wheels, a mechanical advantage is attained and comparatively great power will be developed so that by applying a comparatively small force upon the pinions, the resultant power exerted upon the gear wheel 40 or other article will be comparatively great and sufficient to remove any gear wheels, pulleys, clutches or other articles which are firmly secured to the shaft.

It will be noted that the angularly disposed or inclined surfaces 15 permit the bolts 14 to be moved into various positions toward the axis of the head 6. The slots 17 and 28 permit the bolts 14 to move inwardly and the slots 24 and 33 permit the adjustment of the pinions so that the pinions can be always kept in mesh with the gear wheels. The lugs 16 provide stops, as previously stated, so that when attaching the device, the upper bolts will not fall into contact with the lower bolts.

The arms 9 and 11 are provided with feet 9ª and 11ª whereby the head can be secured to a work bench, if desired.

In Fig. 5, I have shown a modification in which link levers 45 and 46 are arranged in pairs on bolts 47, the bolts 47 being operative to slide laterally on parallel surfaces 48 instead of the angularly disposed surfaces 15, as described in connection with the form of my invention shown in Figs. 1 to 4 inclusive.

Lugs 49 are provided to form stops for the upper and lower bolts in their movement toward each other. However, it will be understood that by making the surfaces 48 substantially parallel on the top and bottom, that the upper bolts 47 and the lower bolts 47 cannot move toward the axis of the head, as is possible in the form of my invention shown in Figs. 1 to 4 inclusive.

In the form of my invention shown in Fig. 5, the bolts 47 are each provided with a gear wheel 50 which is in screw threaded connection therewith in the same manner as described in connection with the gears 21 and 31 and bolts 14. Pinions 51 are rotatably mounted on studs 52 on the link levers 45 and 46 and these pinions mesh with the gear wheels 50. However, since there is no possible adjustment of the bolts 47 toward the axis of the head, it is unnecessary to adjustably mount the studs 52 in slots, for the reason that the bolts 47 will always occupy the same relation to the ends of the levers through which they pass; it being noted that the bolts 47 merely extend through circular holes 53 in the link levers 45 and 46 in distinction to passing through slots, as in the construction illustrated in Figs. 1 to 4 inclusive. In all other respects, the construction of Fig. 5 is generally similar to that of the form shown in Figs. 1 to 4, inclusive, and I have, therefore, given similar parts corresponding reference numerals.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. A device, adapted to remove an article from a shaft, including a head adapted to engage the shaft; clamping bolts having screw threaded portions; means carried by said bolts adapted to engage said article; gear wheels in threaded engagement with the threaded portions of said bolts; and mechanical means for rotating said gear wheels; substantially as described.

2. A device, adapted to remove an article from a shaft including a head adapted to engage the shaft; clamping bolts having screw threaded portions; means carried by said bolts adapted to engage said article; gear wheels in threaded engagement with the threaded portions of said bolts; and pinions adapted to mesh with said gear wheels whereby when the pinions are rotated, the gears will be rotated to produce a longitudinal movement of said bolts relatively to said head; substantially as described.

3. A device, adapted to remove an article from a shaft, including a head adapted to engage the shaft; link levers positioned at the front and rear of said head; clamping bolts connecting said link levers and arranged at opposite sides of said head; and stopping means interposed between said bolts to limit their movement toward each other; substantially as described.

4. A device, adapted to remove an article from a shaft, including a head adapted to engage the shaft; link levers positioned at the front and rear of said head; and clamping bolts connecting said link levers and arranged at opposite sides of said head; said sides of the head extending inwardly whereby the bolts can be moved together and toward the axis of said head; substantially as described.

5. A device, adapted to remove an article from a shaft, including a head adapted to engage the shaft; link levers positioned at the front and rear of said head; clamping bolts connecting said link levers and arranged at opposite sides of said head; said sides of the head extending inwardly whereby the bolts can be moved together and toward the axis of said head; gear wheels in threaded connection with said bolts; and actuating pinions adapted to mesh with said gear wheels; substantially as described.

6. A device, adapted to remove an article from a shaft, including a head adapted to engage the shaft; link levers positioned at the front and rear of said head; clamping bolts connecting said link levers and arranged at opposite sides of said head; said sides of the head extending inwardly whereby the bolts can be moved together and toward the axis of said head; gear wheels in threaded connection with said bolts; and actuating pinions adjustably mounted on said link levers whereby the pinions can be kept in mesh with said gear wheels irrespective of the positions of said bolts; substantially as described.

7. A device, adapted to remove an article from a shaft, including a head adapted to engage the shaft; link levers positioned at the front and rear of said head; clamping bolts connecting said link levers and arranged at opposite sides of said head; and means on said head providing sockets for limiting the movement of said bolts in a direction apart from each other; substantially as described.

8. A device, adapted to remove an article from a shaft, including a head having a recess into which the end of the shaft can extend; means on said head for engagement with said end of the shaft; link levers positioned at the front and rear of said head; and clamping means connecting said link levers and arranged at opposite sides of said head; substantially as described.

In testimony whereof I have signed my name to this specification in the presence of two subscribing witnesses.

GEORGE W. SCHILLING.

Witnesses:
RAYMOND LYSON,
GEORGE BENNETT.

Copies of this patent may be obtained for five cents each, by addressing the "Commissioner of Patents, Washington, D. C."